US010357131B2

(12) United States Patent
Dickson, Jr. et al.

(10) Patent No.: US 10,357,131 B2
(45) Date of Patent: *Jul. 23, 2019

(54) BLENDING JAR WITH SCRAPER APPARATUS

(71) Applicant: BlendTec, Inc., Orem, UT (US)

(72) Inventors: Thomas D. Dickson, Jr., Orem, UT (US); David J. Throckmorton, Mapleton, UT (US); Sterling O. Kingdon, Cedar Hills, UT (US); Mark W. McLane, Lehi, UT (US); Kory B. Robins, Draper, UT (US); Richard C. Galbraith, Provo, UT (US)

(73) Assignee: BLENDTEC, INC., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,398

(22) Filed: Sep. 26, 2017

(65) Prior Publication Data

US 2018/0014693 A1 Jan. 18, 2018

Related U.S. Application Data

(63) Continuation of application No. 13/110,147, filed on May 18, 2011, now Pat. No. 9,770,133.

(51) Int. Cl.
| A47J 43/046 | (2006.01) |
| A47J 43/07  | (2006.01) |
| B01F 7/00   | (2006.01) |
| B01F 7/16   | (2006.01) |
| B01F 15/00  | (2006.01) |

(52) U.S. Cl.
CPC ......... *A47J 43/046* (2013.01); *A47J 43/0716* (2013.01); *A47J 43/0727* (2013.01); *B01F 7/00275* (2013.01); *B01F 7/162* (2013.01); *B01F 15/00058* (2013.01)

(58) Field of Classification Search
CPC .................................................... A47J 43/046
USPC ............... 366/199, 205, 244, 246, 292–296, 366/302–304, 306, 309, 310, 312, 314; 241/98, 199.12, 282.1, 282.2
See application file for complete search history.

(56) References Cited

U.S. PATENT DOCUMENTS

| 750,380 A    | 1/1904  | Lindquist      |
| 2,930,596 A  | 3/1960  | Waters         |
| 3,311,941 A  | 4/1967  | Baker et al.   |
| 3,434,518 A  | 3/1969  | Motis          |
| 3,456,923 A  | 7/1969  | Zeuzem         |
| 3,531,092 A  | 9/1970  | Praschak et al.|
| RE27,002 E   | 12/1970 | Stephan et al. |
| 3,892,365 A  | 7/1975  | Verdun         |
| 3,958,968 A  | 5/1976  | Hosaka         |
| 4,032,117 A  | 6/1977  | Burgess        |
| 4,063,715 A  | 12/1977 | Felker et al.  |
| 4,100,612 A  | 7/1978  | Hoover et al.  |
| 4,822,174 A  | 4/1989  | Deibel         |

(Continued)

*Primary Examiner* — Abbas Rashid
(74) *Attorney, Agent, or Firm* — Dorsey & Whitney LLP

(57) ABSTRACT

A blending apparatus includes a blending jar and a lid. The blending jar has an internal surface defining an internal volume, and a mixing blade positioned within the internal volume. The lid is releasably mounted to the blending jar and includes at least one scraper extending into the internal volume. The at least one scraper is adjacent to the internal surface of the blending jar and is arranged and configured to disrupt rotational flow of food particles within the internal volume and/or scrape food particles from an inner surface of the blending jar.

6 Claims, 15 Drawing Sheets

(56) References Cited

U.S. PATENT DOCUMENTS

| | | |
|---|---|---|
| 5,044,763 A | 9/1991 | Otto |
| 5,201,265 A | 4/1993 | Matsui |
| 5,302,021 A | 4/1994 | Jennett et al. |
| 5,383,613 A | 1/1995 | Sundquist |
| 5,407,270 A | 4/1995 | Barile et al. |
| 5,556,198 A | 9/1996 | Dickson, Jr. et al. |
| 5,655,834 A | 8/1997 | Dickson |
| 5,662,032 A | 9/1997 | Baratta |
| 6,527,433 B2 | 3/2003 | Daniels, Jr. |
| 6,811,303 B2 | 11/2004 | Dickson, Jr. |
| 6,935,767 B2 | 8/2005 | Nikkhah |
| 6,966,689 B2 | 11/2005 | Daniels, Jr. |
| 7,040,799 B2 | 5/2006 | Pryor, Jr. |
| 7,207,506 B1 | 4/2007 | Dickson, Jr. et al. |
| 7,281,842 B2 | 10/2007 | Dickson, Jr. |
| 7,669,793 B2 | 3/2010 | So et al. |
| 7,958,819 B2 | 6/2011 | Sands |
| 2003/0213373 A1 | 11/2003 | Dickson, Jr. |
| 2007/0253283 A1 | 11/2007 | Dickson, Jr. |
| 2010/0232256 A1 | 9/2010 | Pryor, Jr. |
| 2010/0308046 A1 | 12/2010 | Serra |

BLENDING JAR WITH SCRAPER APPARATUS

RELATED APPLICATION

This is a continuation of U.S. patent application Ser. No. 13/110,147 filed on 18 May 2011, now issued as U.S. Pat. No. 9,770,133, the disclosure of which is incorporated, in its entirety, by this reference.

TECHNICAL FIELD

This invention relates to blending devices, and more particularly to blending jars and associated scraping devices for use internally within the blending jar.

BACKGROUND

Food processors and blending devices have existed for many years. Example blending devices are shown and described in U.S. Pat. Nos. 5,655,834 and 6,979,117, which are incorporated herein in their entireties by this reference.

Food processors and blending machines are being used now more than ever, particularly in the high-volume, commercial beverage industry. People are increasingly becoming aware of the benefits, in terms of taste and quality, of well-processed beverages. Blended fruit smoothies and similar fruit drinks, popular with all types of people ranging from the fitness conscious to the less active, require a food processor or blending machine. Cold beverages, in particular, which utilize fruit (frozen or fresh) and ice to prepare present unique challenges in beverage preparation. An appropriate blending machine will break down the ice, frozen fruit, and other ingredients in attempting to achieve an ideal uniform drink consistency. In addition, food processors or blending machines are ideal for mixing nutritional supplements into beverages while similarly attempting to achieve an ideal uniform drink consistency.

In addition to the recent increase in the popularity of smoothies, food processors and blending machines are being used to produce many new and different beverages. For example, different types of coffees, shakes, dairy drinks, and the like are now commonly served at many different types of retail business locations. Consumers are demanding more diversity and variety in the beverages available at these smoothie and other retail stores. The keys to producing a high quality beverage, irrespective of the specific type of beverage, are quality ingredients and a high quality blending machine that will quickly and efficiently blend the ingredients to produce a drink with uniform consistency.

When blending thicker products, such as nut butters or hummus, traditional blending containers may be somewhat difficult and time consuming to use because the product will often stick to the walls of the blending jar. The user must stop the blending machine, remove the lid from the blending jar, manually scrape the internal walls of the blending jar, return the lid to enclose the product within the blending jar, turn on the blending machine, and repeat those steps until the product is properly blended. The time and effort required to achieve a desired blend for the product increases with each additional sequence in which the user must remove the lid and manually scrape the product off the internal wall of the blending jar.

SUMMARY

One aspect of the present disclosure relates to a blending apparatus that includes a blending jar and a lid. The blending jar has an internal surface defining an internal volume, and a mixing blade is positioned within the internal volume. The lid is releasably mounted to the blending jar and includes at least one scraper extending into the internal volume. The at least one scraper is adjacent to the internal surface of the blending jar. The at least one scraper is arranged and configured to disrupt rotational flow of food particles within the internal volume.

The lid may include a pass-through bore. In some embodiments, the lid may include at least two scrapers. The at least one scraper may have a contoured shape along a length thereof. The at least one scraper may have an elongated shape that tapers at a free distal end of the at least one scraper. The at least one scraper may be in contact with the internal surface along substantially an entire length of the at least one scraper.

The lid may include a graspable portion (e.g., a lid handle) accessible from outside of the blending jar when the lid is mounted to the blending jar. The graspable portion may extend in a direction opposite the at least one scraper. The internal surface of the blending jar may extend circumferentially, such that rotating the lid moves the at least one scraper in a circular direction along the internal surface to scrape food particles off of the internal surface and move them into the rotational flow. In embodiments with multiple scrapers, the scrapers may be equally spaced apart circumferentially around the lid. The graspable portion of the lid may extend outside of the blending jar and the at least one scraper may extend within the blending jar. The at least one scraper may include a beveled edge. The lid may be rotatable in opposite directions relative to the blending jar when the lid is mounted to the blending jar.

Another aspect of the present disclosure relates to a blending apparatus that includes a stationary base, a motor mounted to the stationary base, a mixing container, and a lid. The mixing container may include a blade configured to blend food particles held within the mixing container. The mixing container may be removably securable to the stationary base for operable connection of the blade to the motor. The lid may be removably securable to the mixing chamber and include at least one elongate scraper that extends into the mixing container. Rotation of the lid dislodges the food particles from an internal surface of the mixing container with the at least one scraper.

The lid may include first and second scrapers. The first and second scrapers may be equally spaced apart from each other. The at least one scraper may be contoured along its length. The lid may include a graspable portion or lid handle extending opposite from the at least one scraper.

A further aspect of the present disclosure relates to a method of moving food particles in a blending apparatus. The method includes providing a blending jar and a lid, wherein the lid includes at least one scraper. The method further includes blending food particles within the blending jar, removably mounting the lid to the blending jar with the at least one scraper inserted into the blending jar, and rotating the lid relative to the blending jar to remove food particles from an internal surface of the blending jar with the at least one scraper.

The lid may include a graspable portion that extends opposite the at least one scraper, and rotating the lid may include applying a rotational force to the graspable portion. The blending apparatus may include a blending blade positioned within the blending jar, wherein rotating the lid in a first rotational direction moves the food particles toward the blending blade (e.g., in an axial direction toward the blending blade), and rotating the lid in a second rotational direction moves the food particles away from the blending blade (e.g., in an axial direction away from the blending blade). The method may further include interrupting rotational flow of food particles within the blending jar with the at least one scraper.

Another method in accordance with the present disclosure is directed to altering flow in a blending apparatus. The method includes providing a blending jar having a blending blade positioned therein, and a lid having a base portion and at least one scraper extending from the base portion. The method includes operating the blending blade to create a rotational flow of food particles in the blending jar, releasably mounting the lid to the blending jar with the at least one scraper positioned in the rotational flow of food particles, and altering the rotational flow of food particles with the at least one scraper.

The at least one scraper may contact an inner surface of the blending jar, and the method may further include rotating the lid to move the at least one scraper along the inner surface. The at least one scraper may include a beveled surface facing into the rotational flow of food particles, and the beveled surface may force the rotational flow of food particles toward a central axis of the blending jar.

Another aspect of the present disclosure relates to a blending apparatus that includes a blending jar and at least one scraper member. The blending jar has an internal surface defining an internal volume, and a mixing blade positioned within the internal volume. The at least one scraper member extends into the internal volume adjacent to the internal surface. The at least one scraper member is arranged and configured to disrupt rotational flow of food particles within the internal volume.

The blending apparatus may also include a lid releasably mounted to the blending jar, wherein the lid includes the at least one scraper member. The at least one scraper member may extend from the lid vertically downward into the internal volume. Alternatively, the mixing blade may include the at least one scraper member. The at least one scraper member may extend vertically upward from the mixing blade into the internal volume.

The foregoing and other features, utilities and advantages of the invention will become apparent from the following detailed description of the invention with reference to the accompanying drawings.

DETAILED DESCRIPTION

Figure 1:
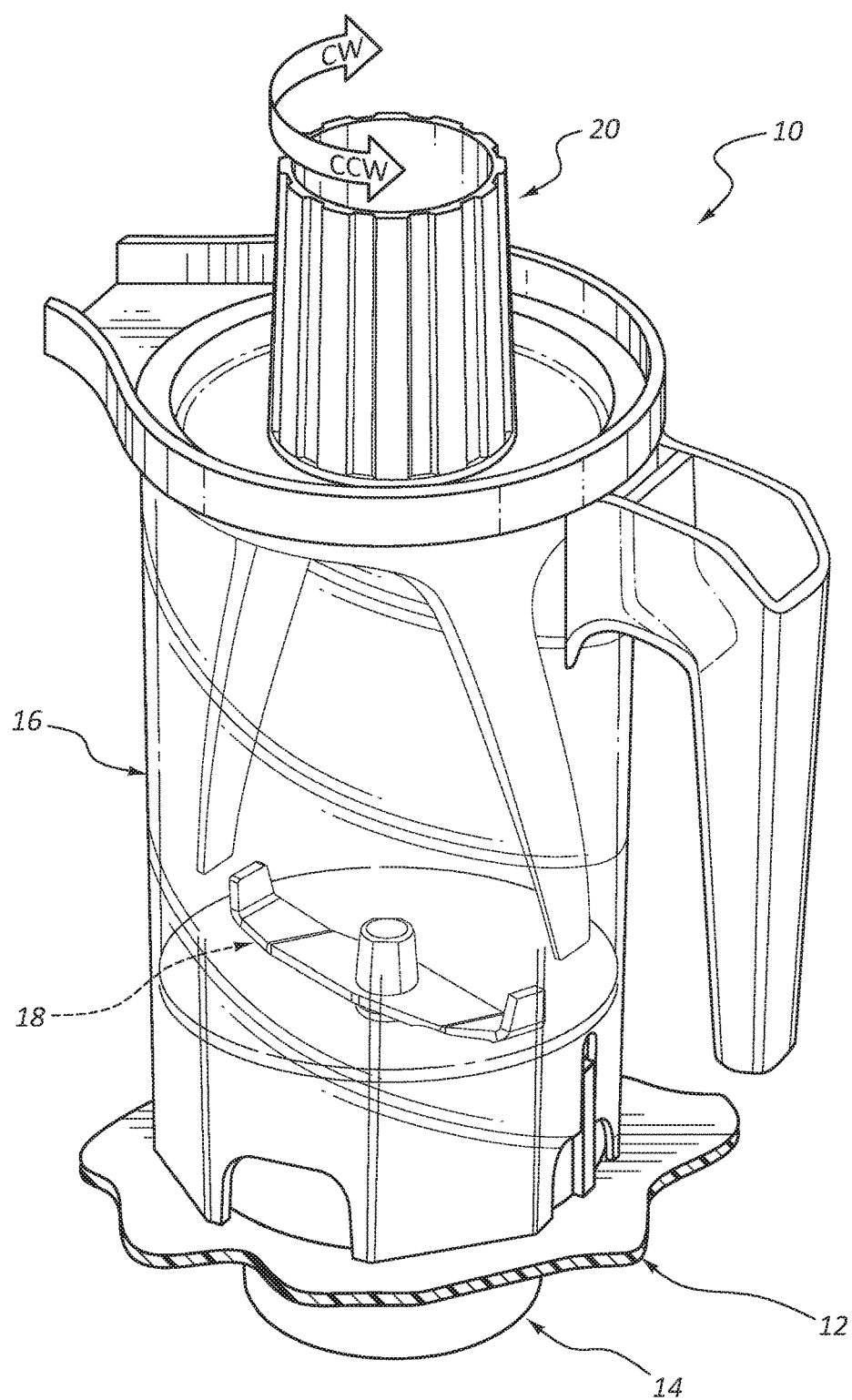
FIG. 1 is a perspective view of an example blender apparatus in accordance with the present disclosure.

The present disclosure relates to aspects of a blending apparatus that help reduce the amount of effort needed to achieve a desired blend of various products. One aspect relates to a blender jar assembly that includes a blending jar and a scraper lid releasably mounted to the blending jar. The jar has a generally cylindrical shape with an interior surface also having a cylindrical configuration. The scraper lid includes at least one scraper member mounted thereto which extends into the interior of the jar when the scraper lid is releasably mounted to the jar. The scraper typically contacts the inner surface of the jar along at least a portion of the length of the scraper. The scraper may be arranged and configured to disrupt a rotational flow of food particles (e.g., partially blended food particles) within the jar to provide improved blending. The scraper may also assist in scraping food particles off a portion or all of the inner cylindrical surface of the jar so that dislodged food particles may enter into the rotational flow of food particles for further blending.

The scraper may be rotatable within the jar while the blender is running (i.e., a blending blade within the blending jar is rotating at high speeds). The scraper may be rotatable with the scraper lid in a direction opposite the rotational direction of the blender blade. In some arrangements, it may be possible to rotate the scraper with the scraper lid in the same direction as the blade rotation. There may be benefits to the scraper being positioned within the jar without rotating the scraper relative to the jar.

The flow disruption and scraping function of the scraper within the jar may help continually reintroduce the food particles into an area of the jar where the food particles may be acted upon by the rotating blending blade. The scraper may reduce the amount of time the food particles are in contact with the inner surface of the jar, thereby reducing the amount of time required to reach a desired blended consistency of the food particles and in some cases, obtain liquification of the food particles.

The scrapers may have various shapes, sizes, and orientations relative to the scraper lid and jar. In one example, the scraper includes a contoured or curved portion along its length. The scraper may be contoured or angled circumferentially. The scraper may also be contoured or angled radially inward. The scraper may have a contour or curvature along its length that matches a curvature or angle of the inner surface of the jar from a top open end to a bottom closed end of the jar to help maintain contact of the scraper with the inner surface of the jar along substantially an entire length or a portion of the length of the scraper. The curvature and other features of the scraper may improve the scraping function and flow disruption by limiting the ability of food particles to become trapped or packed underneath a portion of the scraper or in the area between the scraper and the area within the jar where the blending blade operates. The contour and other features of the scraper may help lift and remove food particles from the inner surface of the jar to help reintroduce the food particles to a rotational flow of food particles in the jar or to a location within the jar where the food particles may be acted upon by the blending blade when the blade is operating (i.e., a "blade area").

The scraper lid may include a pass-through hole into which additional food particles may be delivered into the jar while the scraper lid is mounted to the jar. The scraper lid may include a lid handle that extends in an opposite direction from the scraper. The lid handle may provide a graspable member or portion that the user may use to apply a rotational or torque force to the scraper lid to rotate the scraper within the jar. The pass-through hole may extend through the lid handle.

The jar may have a shape and size that may provide easier and/or improved blending of small amounts of food particles in a shorter amount of time with less effort as compared to using jars of different size and shape.

Referring now to FIGS. 1-10, an example blender apparatus 10 having a blending jar and scraper lid with features described above is shown and described with greater detail. The blender apparatus 10 includes a base 12 having a motor 14 positioned therein, a blending jar 16 releasably mounted to the base 12, a blending blade 18 positioned in the blending jar 16, and a scraper lid 20 releasably mounted to the blending jar 16. Mounting the scraper lid 20 to the blending jar 16 positions a pair of first and second scraper members 52, 54 within the blending jar 16. Rotating the scraper lid 20 in clockwise (CW) and counterclockwise (CCW) directions relative to the blending jar 16 a shown FIG. 1 moves the first and second scraper members 52, 54 along an inner surface of the blending jar 16. The first and second scraper members 52, 54 may disrupt rotational flow of food particles in the blending jar 16 whether the first and second scraper members 52, 54 are held stationary or rotated in the clockwise or counterclockwise directions while the blending blade 18 is in operation. Rotating the first and second scraper members 52, 54 may move food particles held within the blending jar 16 (e.g., detach or lift the food particles off of the inner surface of the blending jar 16 and move the food particles axially toward or away from the blending blade 18). The shape and size of the first and second scraper members 52, 54 may help direct food particles into an area within the blending jar 16 wherein the food particles may be acted upon by the rotating blending blade 18.

The base 12 may include a jar mounting portion 22. A driveshaft 24 may extend through the base 12 for access adjacent to the jar mounting portion 22. The driveshaft 24 may be operably connected to the motor 14, wherein operation of the motor 14 rotates the driveshaft 24. The driveshaft 24 may be operably connected to the blending blade 18 when the blending jar 16 is mounted to the base 12.

Figure 2:
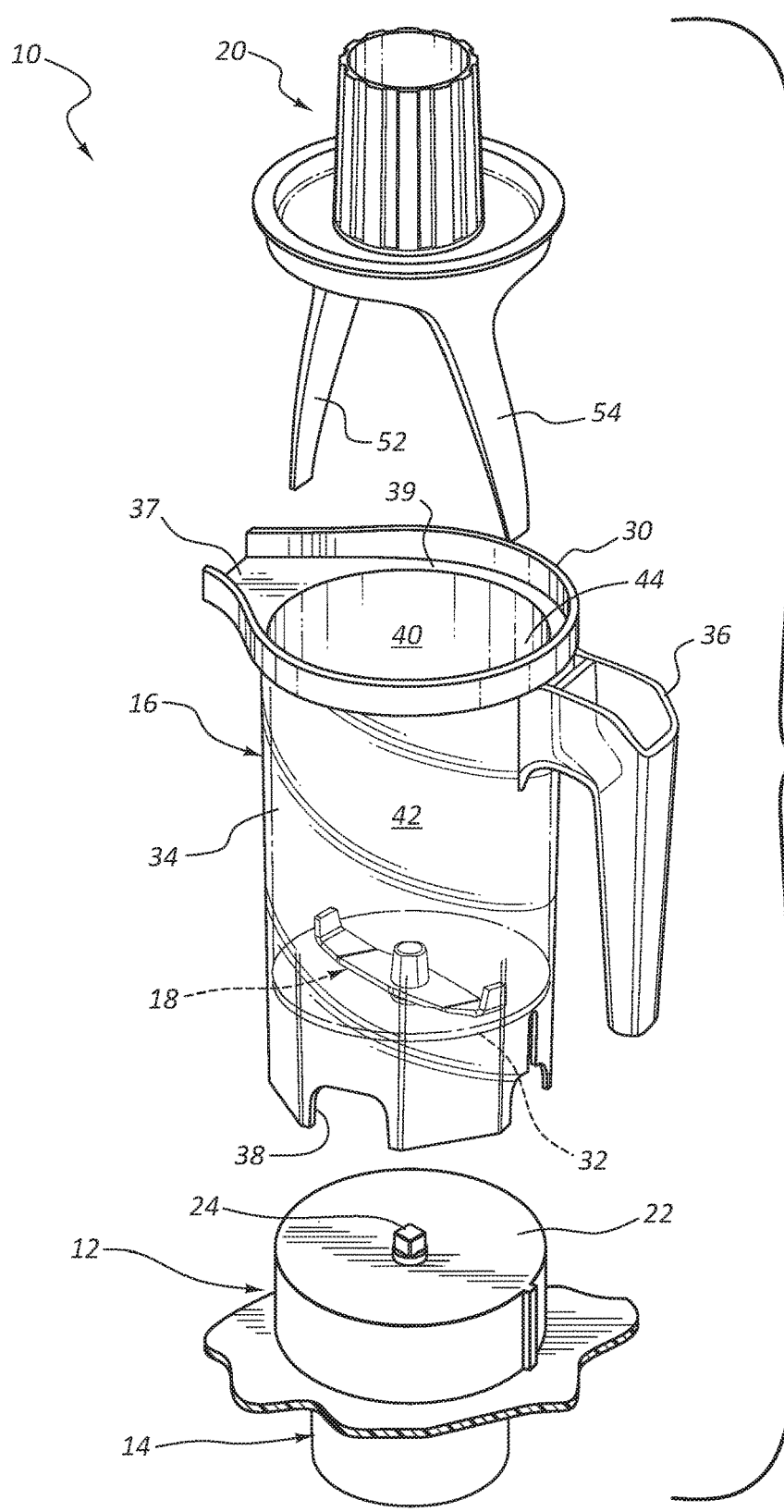
FIG. 2 is an exploded perspective view of the blender apparatus of FIG. 1.

The blending jar 16 includes an open end 30, a closed end 32, a sidewall 34, a jar handle 36, a spout 37, and a mounting portion 38 (see FIG. 2). The mounting portion 38 may mate with the jar mounting portion 22 of the base 12 to provide a releasable connection of the blending jar 16 to the base 12. A lid recess 39 may be formed at the open end 30 and sized to receive the scraper lid 20. A portion of the scraper lid 20 may contact the lid recess 39. Another portion of the scraper lid 20 may contact an inner surface 40 of the blending jar 16. The blending jar 16 may also include an outer surface 42, an inner volume or cavity 44 defined by the inner surface 40, an inner diameter $D_1$, and a jar inner surface angle α (see FIG. 3).

In one embodiment, the inner diameter $D_1$ may be in the range of about 3 inches to about 6 inches, and more preferably about 3 inches to about 4 inches. The jar inner surface angle α, which may be defined as a taper angle from the top open end 30 to the bottom closed end 32, is typically in the range of about 1° to about 10°, and more preferably about 3° to about 5°.

Figure 3:
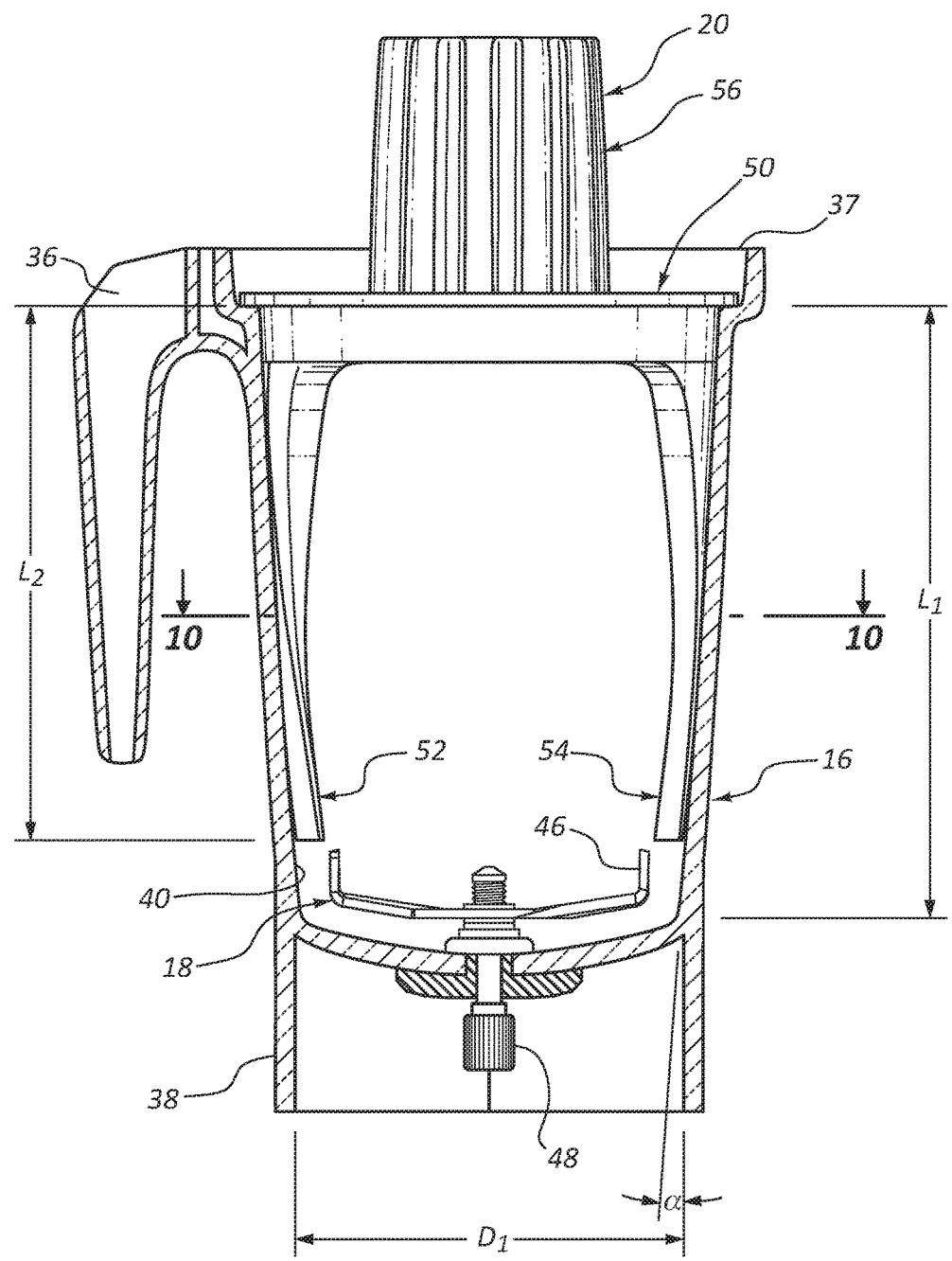
FIG. 3 is a partial cross-sectional side view of a blending jar and scraper lid of the blender apparatus of FIG. 1.

The inner, cylindrical volume 44 (FIG. 2) may have a length $L_1$ extending from the closed end 32 to the lid recess 39 (see FIG. 3). The inner volume 44 may also have a length $L_2$ that extends from the lid recess 39 to an upper most portion of the blending blade 18 (i.e., a top surface of a tip 46 of the blending blade 18) (see FIG. 3). The lengths $L_1$, $L_2$ are typically in the range of about 2 inches to about 12 inches, although many other sizes are possible.

Figure 10:
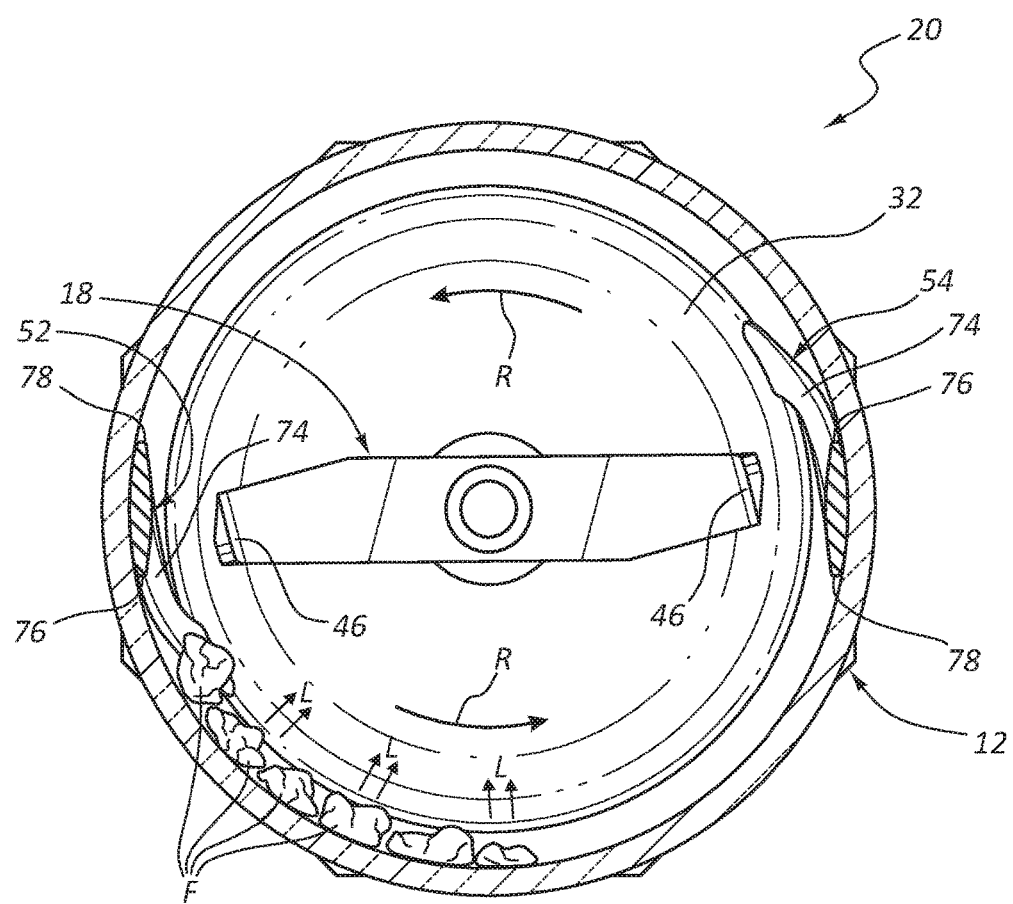
FIG. 10 is a cross-sectional view of the blender apparatus of FIG. 3 taken along cross-section indicators 10-10.
Figure 11:
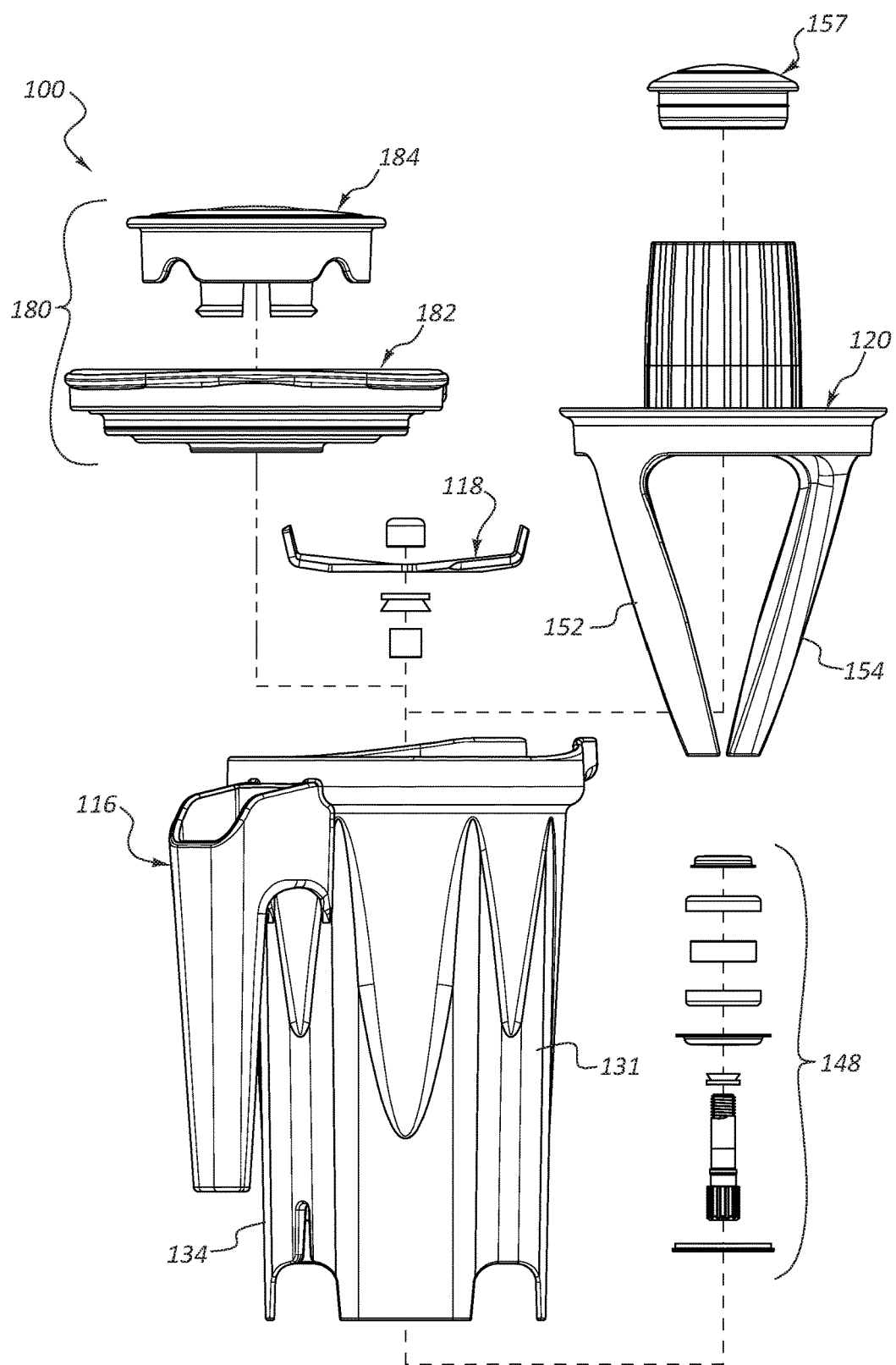
FIG. 11 is an exploded view of another example blending jar with multiple lid assemblies in accordance with the present disclosure.

The blending jar 16 may have an inner volume 44 that generally corresponds to a cylindrical shape, which may be circular in cross-section (see FIG. 10). Providing the circular cross-section for the blending jar 16 may provide improved contact between the first and second scraper members 52, 54 of the scraper lid 20 with the inner cylindrical surface 40 of the blending jar 16. A circular cross-section may also provide easier rotatability of the scraper lid 20 relative to the blending jar 16, and rotatability of the scraper lid 20 with a relatively constant amount of friction (particularly given a collection of food particles on the inside surface of the jar) and corresponding torsional force applied to the scraper lid 20. Other shapes and sizes are possible for the blending jar 16 that would provide at least some contact between the first and second scraper members 52, 54 and the inner surface 40 when the scraper lid 20 is rotated relative to the blending jar 16.

Referring now to FIGS. 4-9, the scraper lid 20 includes a base portion 50, the first and second scraper members 52, 54 described above, a lid handle 56, and a lid aperture 58. The scraper lid 20 may be integrally formed as a single piece. The scraper lid 20 may comprise a polymer material, such as, for example, a polycarbonate material, or any other suitable material known to those skilled in the art. In some examples, the first and second scraper members 52, 54 may be generally rigid along their lengths. In one example, the first and second scraper members 52, 54 may include a plurality of layers or include an embedded member that provides additional rigidity and strength.

Figure 4:
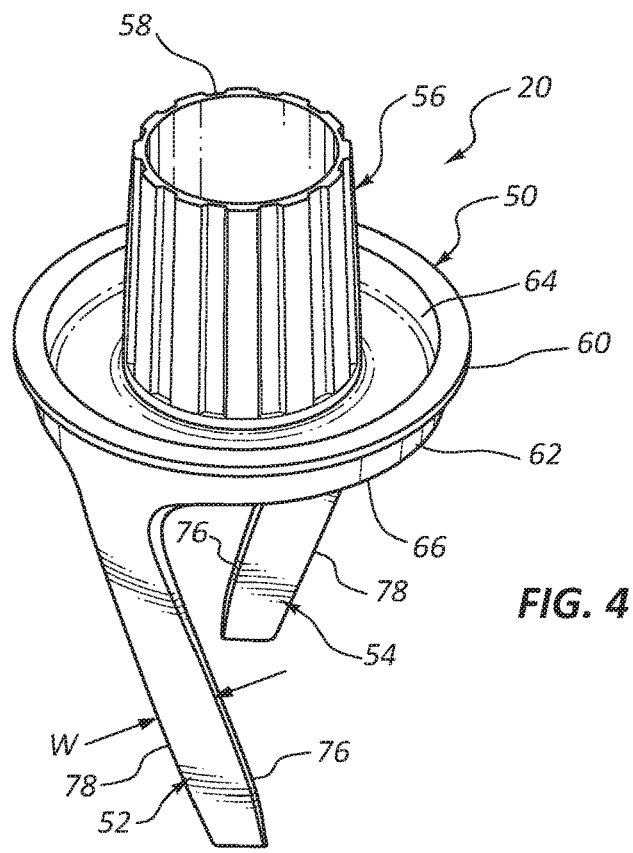
FIG. 4 is a top perspective view of the scraper lid shown in FIGS. 1-3.
Figure 5:
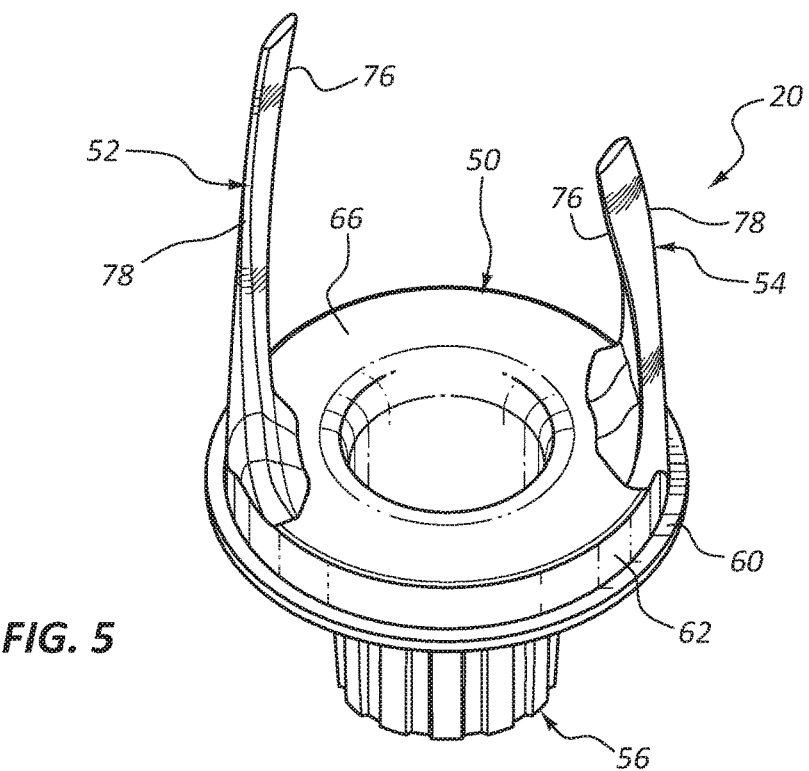
FIG. 5 is a bottom perspective view of the scraper lid shown in FIG. 4.

The base portion 50 may include a lip 60, a periphery sealing surface 62, a top surface 64, and a bottom surface 66 (see FIGS. 4-5). The lip 60 may be sized to extend into the lid recess 39 of the blending jar 16 (see FIG. 3). The periphery sealing surface 62 may extend into and maintain contact with the inner surface 40 of the blending jar 16 (see FIG. 3). The periphery sealing surface 62 may provide a fluid tight seal between the scraper lid 20 and the blending jar 16. Other arrangements are possible for the scraper lid 20, including, for example, an arrangement in which the lip 60 rests on an upper most surface of the blending jar 16 and the periphery sealing surface 62 contacts a surface of the lid recess 39.

The first and second scraper members 52, 54 extend from the bottom surface 66 of the base portion 50. The lid handle 56 extends from the top surface 64 of the base portion 50. The first and second scraper members 52, 54 may extend from the base portion 50 in a direction opposite the direction of extension of the lid handle 56 from the base portion 50.

The first and second scraper members 52, 54 may be integrally formed as a single, unitary piece with the base portion 50. Alternatively, the first and second scraper members 52, 54 may be separately formed from the base portion 50 and mounted either permanently or releasably to the base portion 50. The first and second scraper members 52, 54 may be replaceable portions of the scraper lid 20.

The first and second scraper members 52, 54 may each include first and second ends 70, 72, a bevel 74, a leading edge 76, and a trailing edge 78. The first and second scraper members 52, 54 may also have a scraper length $L_3$ (see FIG. 7) and a width W (see FIG. 4). The bevel 74 may be defined along the leading edge 76 and extend across at least a portion of the width W. The bevel 74 may assist in lifting or moving the food particles positioned on the inner surface 40 of the blending jar 16. The bevel 74 may have a bevel angle $\delta_4$ as shown in FIG. 8. The bevel angle $\delta_4$ may be in the range of, for example, about 5° to about 60°, and more preferably about 20° to about 30°.

Figure 6:
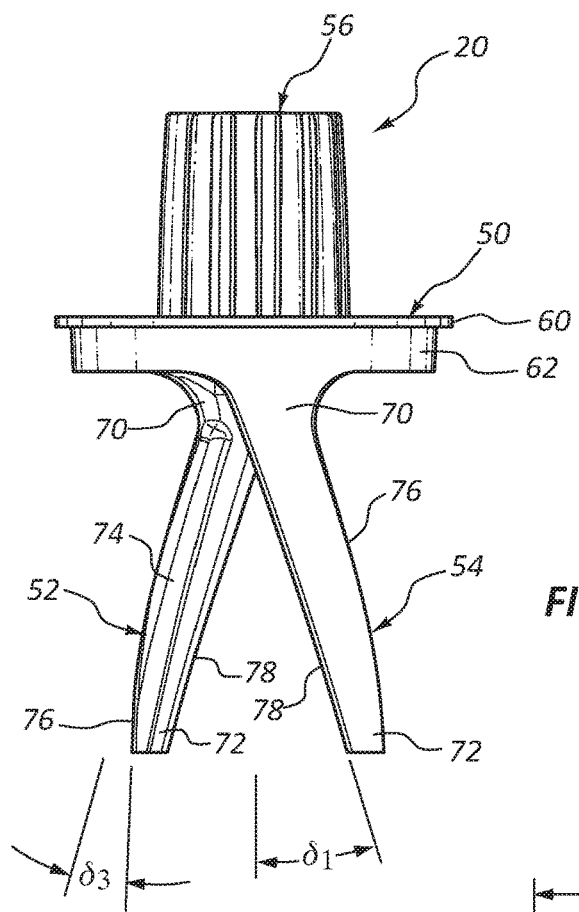
FIG. 6 is a front view of the scraper lid shown in FIG. 4.

Referring to FIG. 6, the first and second scraper members 52, 54 may extend at a circumferential extension angle $\delta_1$ relative to a central axis of the scraper lid 20. The circumferential extension angle $\delta_1$ may be in the range of, for example, about 5° to about 45°, and more preferably about 20° to about 30°.

Figure 7:
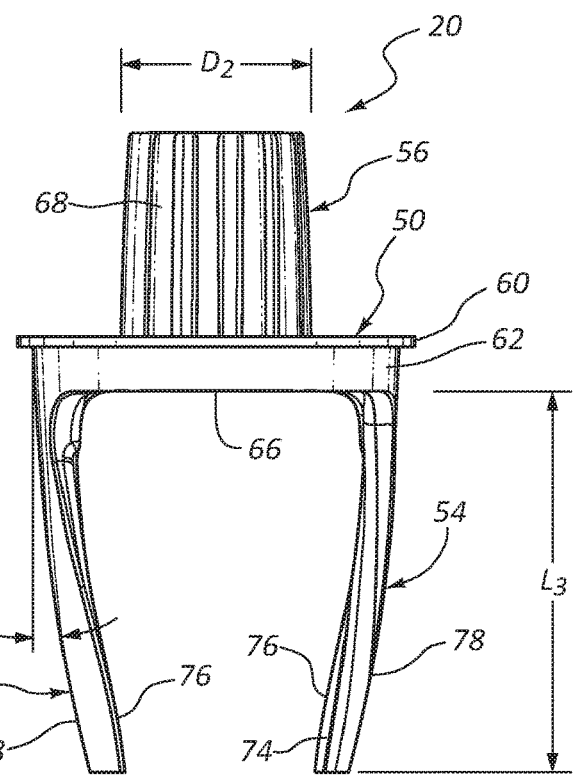
FIG. 7 is a side view of the scraper lid shown in FIG. 4.
Figure 8:
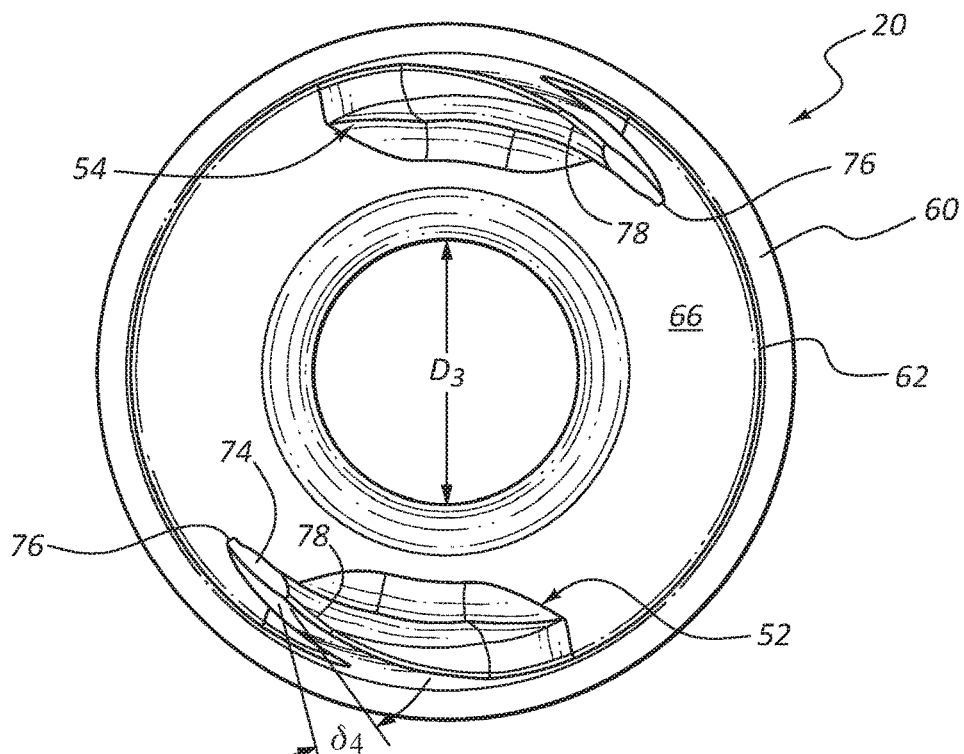
FIG. 8 is a bottom view of the scraper lid shown in FIG. 4.
Figure 9:
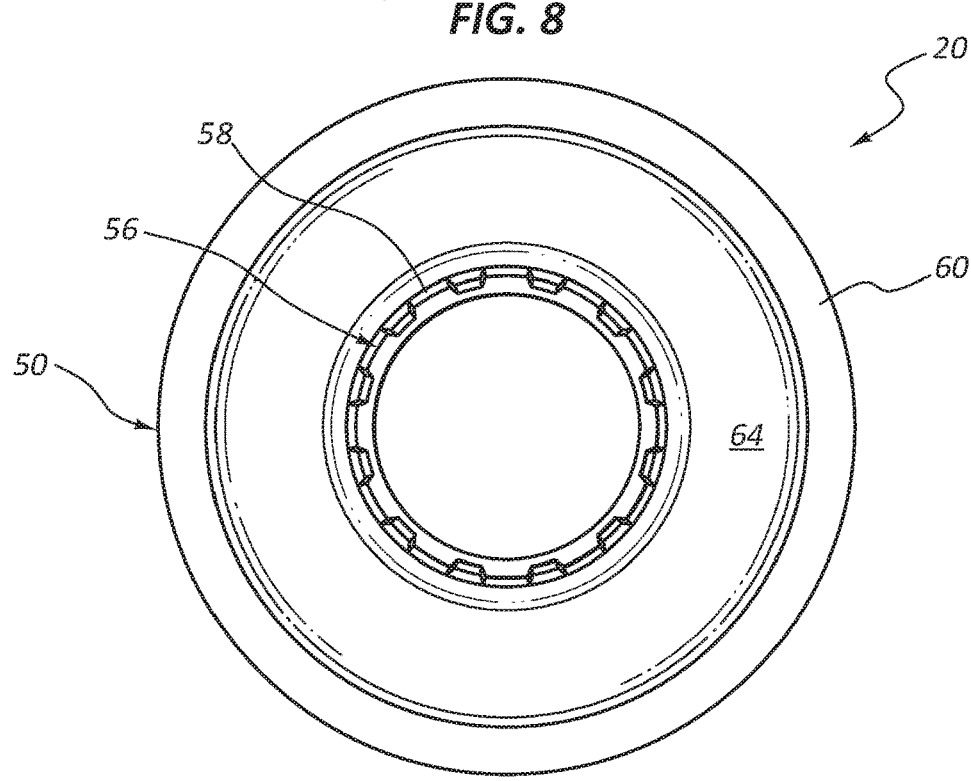
FIG. 9 is a top view of the scraper lid shown in FIG. 4.

Referring to FIG. 7, the first and second scraper members 52, 54 may have a radial extension angle $\delta_2$ relative to a central axis of the scraper lid 20. The radial extension angle $\delta_2$ may substantially mirror the jar surface angle α. The radial extension angle $\delta_2$ may be in the range of, for example, about 1° to about 10°, and more preferably about 2° to about 5°. The radial extension angle $\delta_2$, alone or in combination with the jar surface angle α, may assist in inserting the first and second scraper members 52, 54 into the inner volume 44 of the blending jar 16. The first and second scraper members 52, 54 may partially contact the inner surface 40 of the blending jar 16 during insertion, and completely contact the inner surface 40 only after full insertion of the scraper lid 20 into its final resting position within the lid recess 39 (see FIG. 3). In other arrangements, the radial extension angle $\delta_2$ is close to 0° and the first and second scraper members 52, 54 are deflected radially inward as the scraper lid 20 is mounted to the blending jar 16.

The first and second scraper members 52, 54 may taper to a smaller width W towards the second end 72, as shown in FIG. 6. The taper at the second end 72 may have a taper angle $\delta_3$ (see FIG. 6). The taper angle $\delta_3$ may be in the range of, for example, about 1° to about 30°, and more preferably about 5° to about 20°. The taper angle $\delta_3$ may arrange the leading edge 76 at the second end 72 to be substantially parallel with the central axis of the scraper lid 20.

The first and second scraper members 52, 54 may be equally spaced apart around a circumference of the base portion 50 as shown in at least FIG. 8. Other arrangements may include different orientations and spacing between the first and second scraper members 52, 54. Furthermore, different numbers of scraper members may be possible. In one example, a single one of the scraper members 52, 54 is provided on the scraper lid 20. In other arrangements, three or more scraper members are positioned on the scraper lid 20. The scraper members shown in FIGS. 1-10 have the same length $L_3$. In other arrangements, at least some of the scraper members have different lengths than the others. Similarly, the various scraper members of a given scraper lid may have different widths and angles $\delta_{1-4}$.

Referring to FIG. 10, an example food rotational flow R is shown in the blending jar 16 with the scraper lid 20 mounted to the blending jar 16. The first and second scraper members 52, 54 direct the food particles in the food rotational flow R in a radially inward direction L. This directing of the food particles radially inward may be referred to as flow disruption or disruption of the food rotation flow R. Rotating the scraper lid 20 in the clockwise or counterclockwise direction, or maintaining the scraper lid 20 in a stationary rotated position may all provide the radially inward directed flow disruption for the food rotational flow R.

Typically, rotating the scraper lid 20 in either the clockwise or counterclockwise direction may also help detach or lift food particles from the inner surface 40 of the blending jar 16. The first and second scraper members 52, 54 may have the bevel feature 74 along the leading edge 76, and a relatively blunt surface along the trailing edge 78. The bevel and blunt features of the leading and trailing edge 76, 78, respectively, may have different advantages related to moving food particles in the blending jar 16 depending on, for example, the type of food article being blended and whether or not the blending blade 18 is being operated. Other features of the first and second scraper members 52, 53, such as, for example, any of the angles $\delta_{1-3}$, may provide certain advantages related to flow disruption and food scraping when rotating the scraper lid 20 in either the clockwise or counterclockwise direction.

Referring now to FIGS. 11-17C, another example blender apparatus 100 is shown and described. The blender apparatus includes a blending jar, a scraper lid assembly, and recessed lid assembly. The blender apparatus 100 may have many of the same or similar features as the blender apparatus 10, including the base 12 having a motor 14 positioned therein as described above with reference to FIG. 1. A blending jar 116 may be releasably mounted to the base 12. A blending blade 118 is positioned in the blending jar 116. The blending blade may include tips 146 (see FIG. 13B) A scraper lid 120 may be releasably mounted to the blending jar 116. A recessed lid assembly 180 may be releasably mounted to the blending jar 116 in place of the scraper lid 120.

The scraper lid 120 includes a pair of first and second scraper members 152, 154 that extend into the blending jar 116. Rotating the scraper lid 120 relative to the blending jar 116 moves the first and second scraper members 152, 154 along an inner surface of the blending jar 116. The first and second scraper members 152, 154 may disrupt rotational flow of food particles in the blending jar 116. Rotating the first and second scraper members 152, 154 may move food particles held within the blending jar 116 (e.g., detach or lift the food particles off of the inner surface of the blending jar 116). The shape and size of the first and second scraper members 152, 154 may help direct food particles into an area within the blending jar 116 wherein the food particles may be acted upon by the rotating blending blade 118 as described above related to blender apparatus 10. The first and second scraper members 152, 154 may have the same or similar features as the first and second scraper members 52, 54 described above.

The blending jar 116 may include many of the same or similar features as described above for the blending jar 16. The blending jar 116 may also include an outer surface 131 along a sidewall 134 (see FIG. 11) that is contoured or shaped. The contour or shape of outer surface 131 may provide additional strength to the blending jar 116. The contour or shape of the outer surface 131 may provide improved aesthetics for the blending jar 116. The blending jar 116 may be constructed to permit stacking of a plurality of blending jars 116 one inside of the other.

Referring now to FIGS. 11, 12A-B, 14A-D and 15A-B, the scraper lid 120 includes a base portion 150, the first and second scraper members 152, 154 described above, a lid handle 156, a lid aperture 158, and a cap 157. The base portion 150, first and second scraper members 152, 154, and lid handle 156 may be integrally formed as a single piece. Alternatively, the first and second scraper members 152, 154 may be separately formed from the base portion 150 and mounted either permanently or releasably to the base portion 150. The first and second scraper members 152, 154 may be replaceable portions of the scraper lid 120. The cap 157 may mount to the lid handle 156 and cover the lid aperture 158.

The scraper lid 120 may be mounted to the blending jar 116 at an open upper end of the blending jar 116. A portion of the scraper lid 120 may extend into the blending jar 116 and contact an inner surface of the blending jar 116. At least one portion of the scraper lid 120 may create a fluid tight seal with a portion of the blending jar 116 (e.g., see FIG. 12B).

Figure 14A:
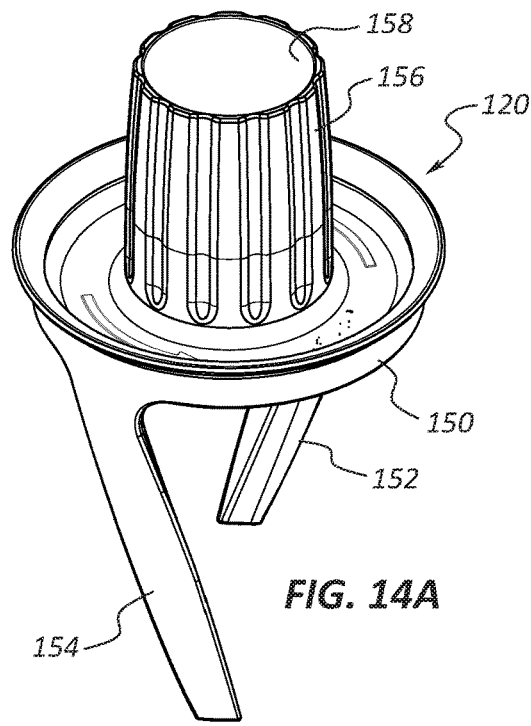
FIG. 14A is a top perspective view of the scraper lid of FIG. 11.
Figure 14B:
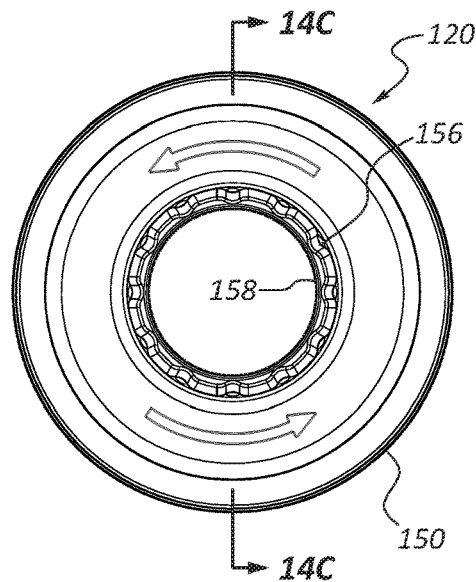
FIG. 14B is a top view of the scraper lid of FIG. 14A.
Figure 14C:
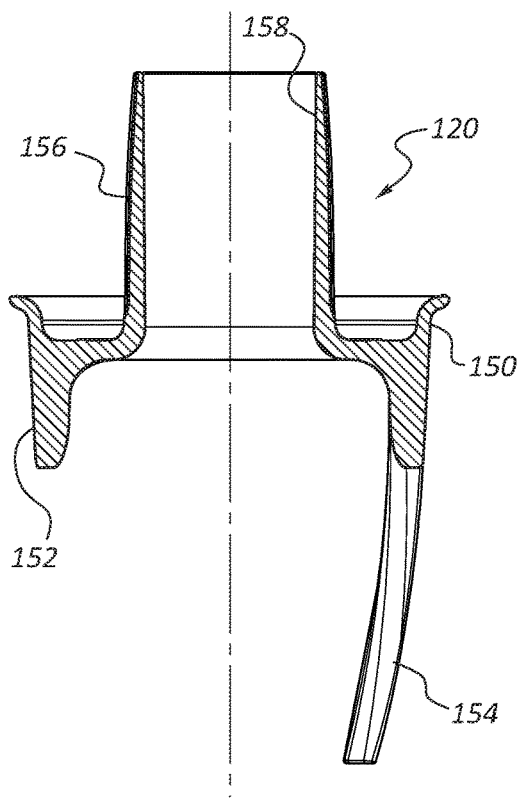
FIG. 14C is a cross-sectional view of the scraper lid of FIG. 14B taken along cross-section indicators 14C-14C.
Figure 14D:
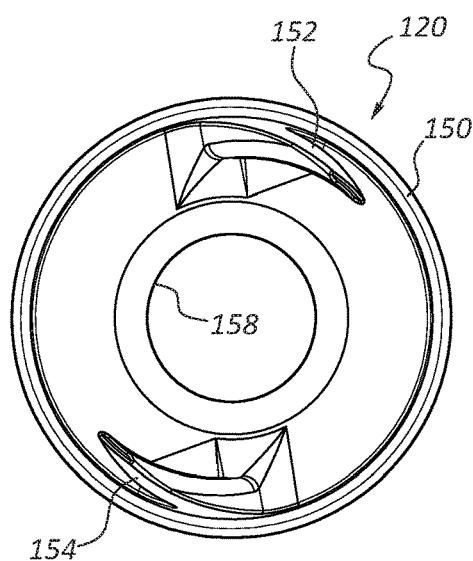
FIG. 14D is a bottom view of the scraper lid of FIG. 14A.
Figure 15A:
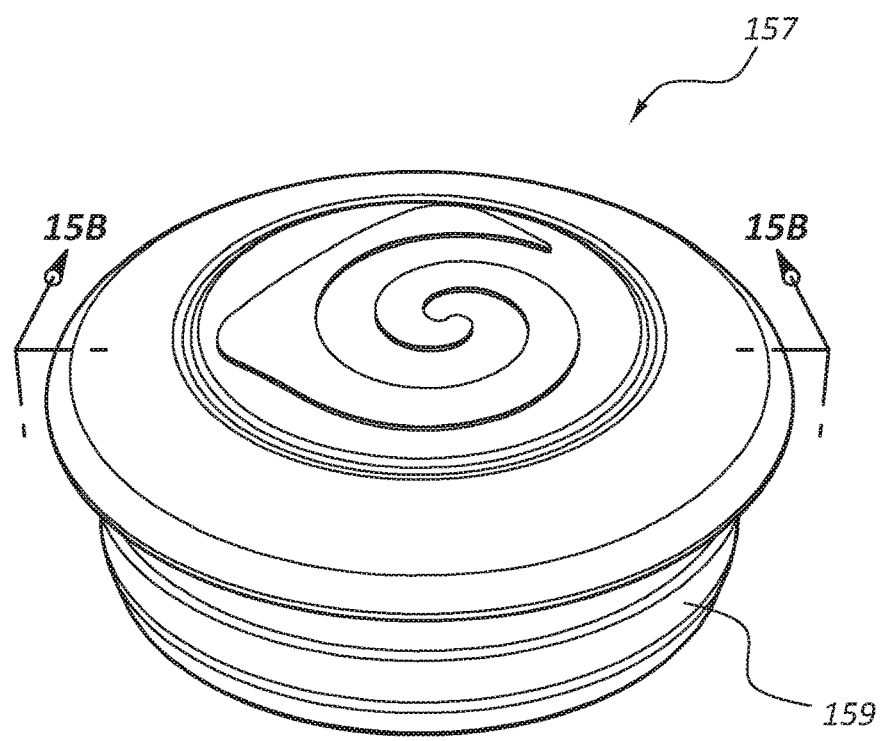
FIG. 15A is a top perspective view of a cap of the scraper lid assembly of FIG. 11.
Figure 15B:
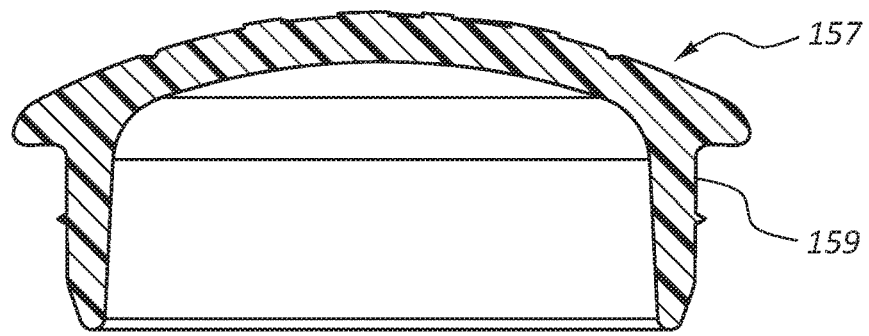
FIG. 15B is a cross-sectional view of the cap of FIG. 15A taken along cross-section indicators 15B-15B.
Figure 16A:
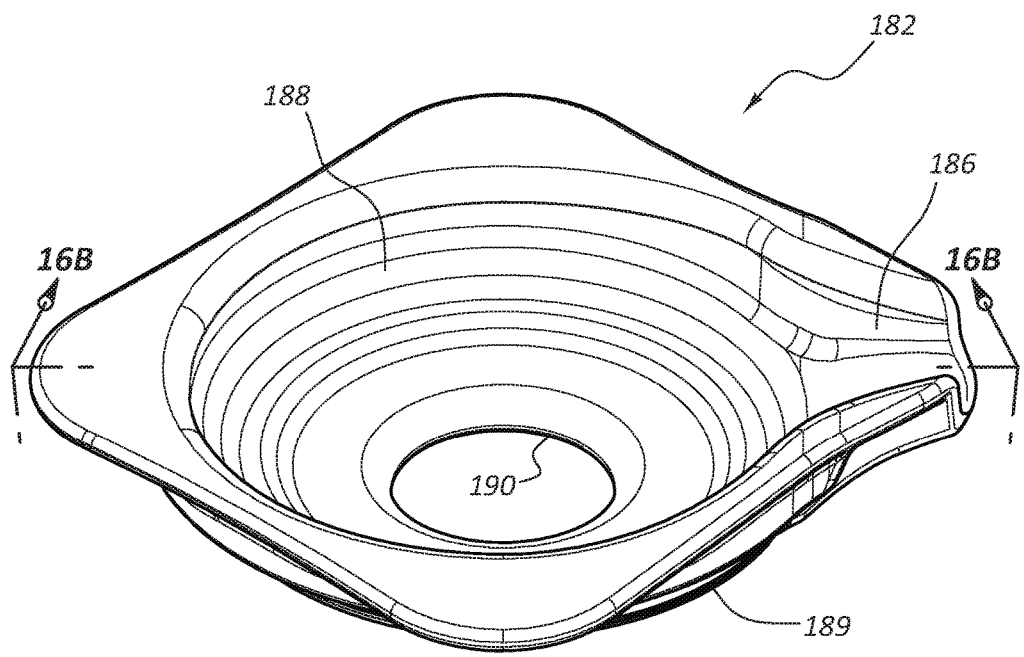
FIG. 16A is a top perspective view of the recessed lid of FIG. 11.
Figure 16B:
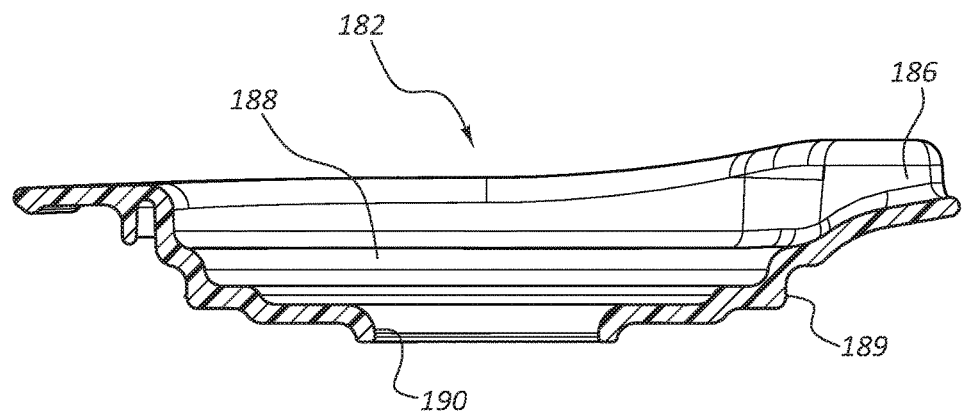
FIG. 16B is a cross-sectional view of the recessed lid of FIG. 16A.

The first and second scraper members 152, 154 may be equally spaced apart around a circumference of the base portion 150 as shown in at least FIG. 14D. Other arrangements may include different orientations and spacing between the first and second scraper members 152, 154. Other embodiments include different numbers of scraper members (e.g., a single scraper member or three or more scraper members). The first and second scraper members may be generally planar in configuration or have a helical twist to their configuration. The first and second scraper members 152, 154 may have the same or different physical properties such as, for example, lengths, widths, thicknesses, contours, taper features, angled arrangements, and other features.

Figures 12A, 12B:
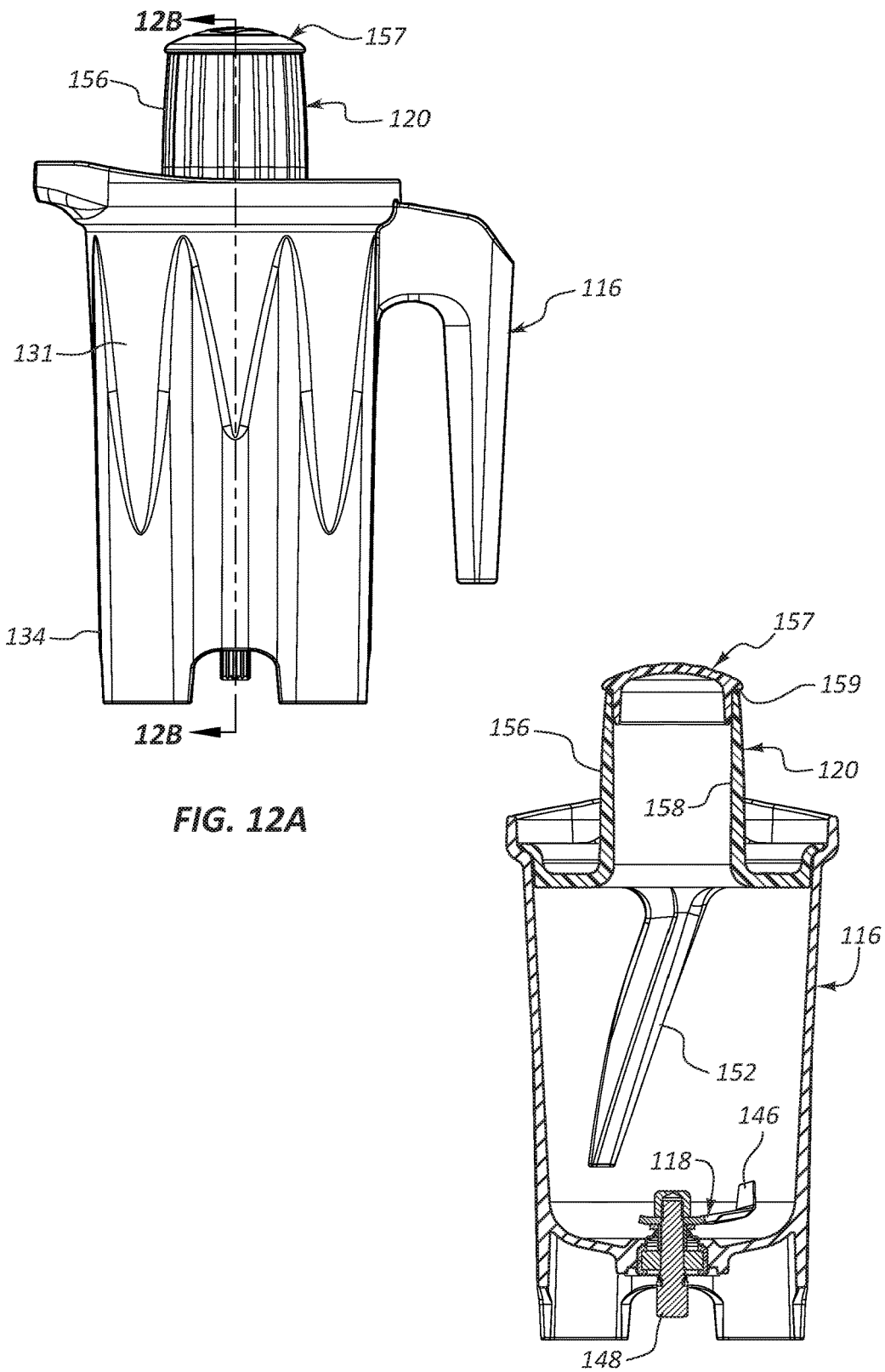
FIG. 12A is a side view of the blending jar and scraper lid assembly of FIG. 11.
FIG. 12B is a cross-sectional view of the blending jar and scraper lid assembly of FIG. 11 taken along cross-section indicators 12B-12B.

The cap 157 has a generally circular construction that matches the generally circular shape of the lid aperture 158. The cap 157 may include a cap sealing surface 159 (see FIGS. 15A-B). The cap sealing surface 159 may contact and provide a seal with a portion of the lid handle 156. FIG. 12B shows the cap sealing surface 159 contacting an internal surface of the lid handle 156 to form a fluid tight seal. Other portions of the cap 157 may form sealing interfaces with portions of the lid handle 156.

The recessed lid assembly 180 includes a recessed lid 182 and a splash lid 184 (see FIGS. 11, 13A-B and 16A-17C). The recessed lid 182 is configured to releasably mount to the open top end of the blending jar 116. The splash lid 184 is configured to releasably mount to the recessed lid 182. The recessed lid 182 includes a spout 186, a recess 188, a recess opening 190, and a seal surface 189 (see FIGS. 16A-B). The spout 186 may further accommodate the addition of ingredients into the blender jar 116 while the blending blade 118 is operating and the splash lid 184 is in place. The spout 186 provides a place to pour liquids that are intended to be add to the contents of the blender jar 116 while the blender apparatus 100 is in operation without having to remove the recessed lid 182 or splash lid 184 in order to do so. The recess opening 190 may provide access into the blending jar 116 while the recessed lid 182 is mounted to the blending jar 116. For example, a user may insert ingredients through the recess opening 190 and into the blending jar 116 while the blending blade 118 is operating.

Figure 17A:
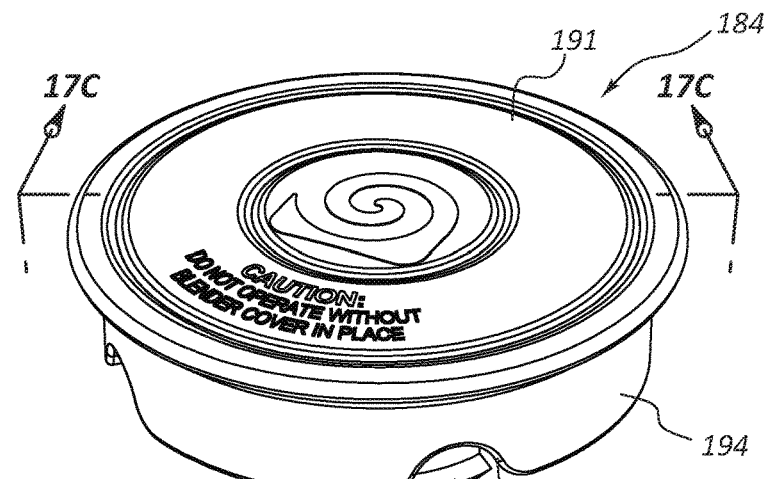
FIG. 17A is a top perspective view of the splash lid of FIG. 11.
Figure 17B:
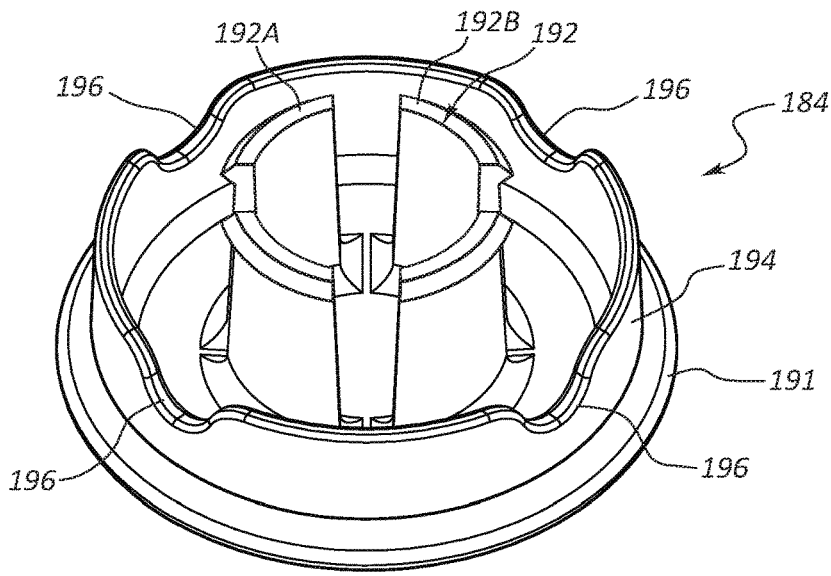
FIG. 17B is a bottom perspective view of the splash lid of FIG. 17A.
Figure 17C:
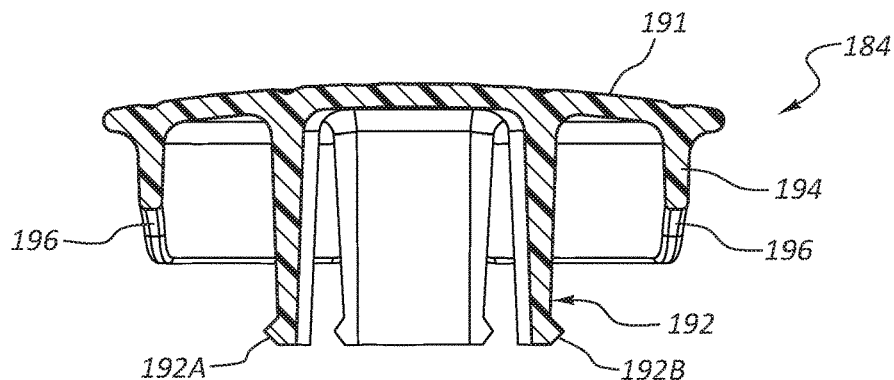
FIG. 17C is a cross-sectional view of the splash lid of FIG. 17A taken along cross-sectional indicators 17C-17C.

The splash lid 184 may include a base 191, a connection portion 192, a support portion 194, and a plurality of cutouts 196 (see FIGS. 17A-C). The connection portion 192 and support portion 194 extend from and are supported by the base 191. The connection portion 192 is configured to provide a releasable connection between the recessed lid 182 and the splash lid 184. The connection portion 192 may include a snap-fit feature that provides a snap-fit connection between the recessed lid 182 and the splash lid 184. A portion of the connection portion 192 may extend through the recess opening 190 in the recessed lid 182 (see FIG. 13B). The connection portion 192 may include a plurality of connection members 192A-B. The connection members 192A-B may operate independently. The connection portion 192 may have many different types of connection features that assist in releasably connecting the splash lid 184 to the recessed lid 182.

Figure 13A:
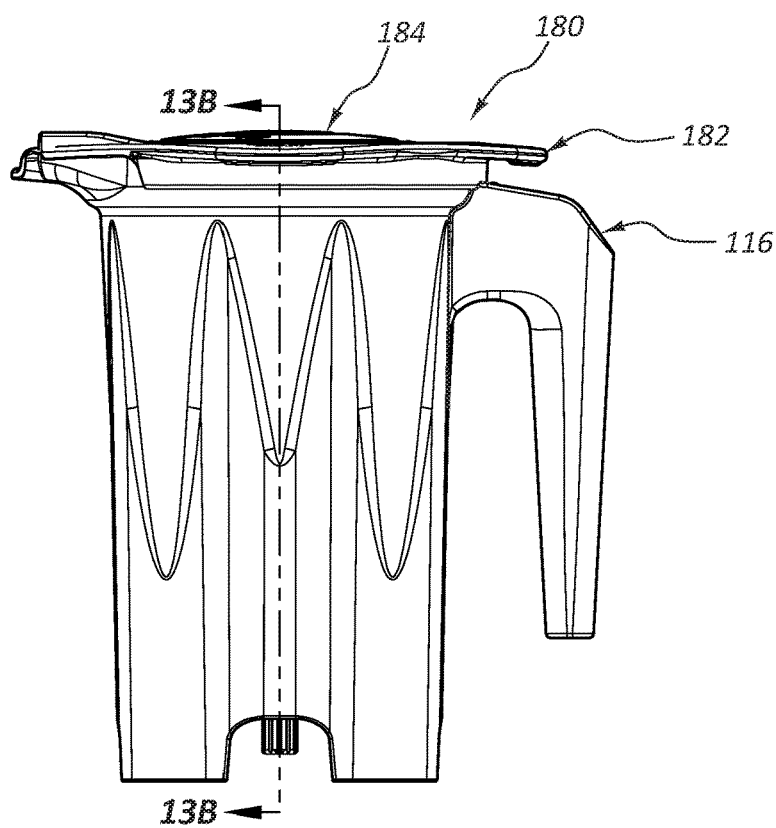
FIG. 13A is a side view of the blending jar and recessed lid assembly of FIG. 11.
Figure 13B:
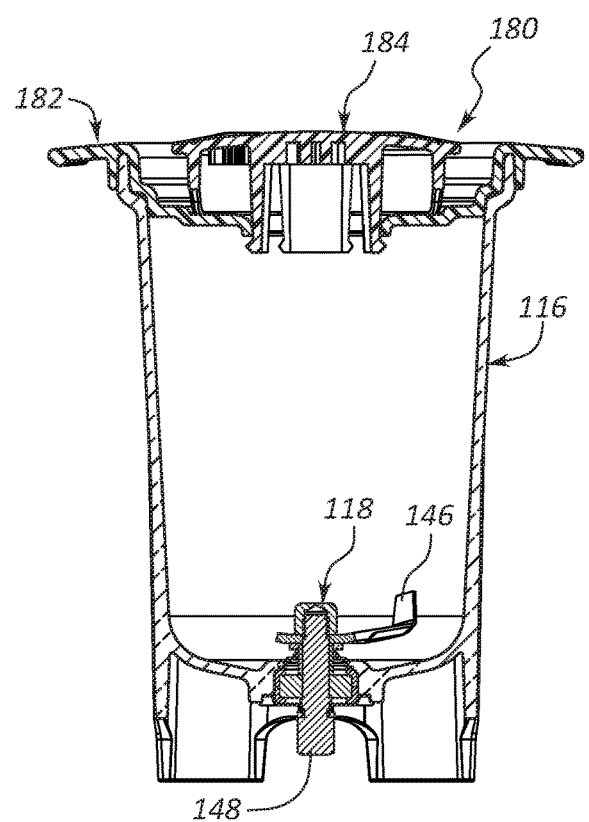
FIG. 13B is a cross-sectional view of the blending jar and recessed lid assembly of FIG. 11 taken along cross-section indicators 13B-13B.

The support portion 194 may operate to support the splash lid 184 on the recessed lid 182 (see FIG. 13B). The support portion 194 may space apart the base 191 from surfaces of the recess 188. The cutouts 196 may be formed in the support portion 194 at spaced apart locations around a perimeter of the support portion 194 (see FIG. 17B). The cutouts 196 may provide a flow path from inside the splash lid 184 into the recess 188, and out of the recessed lid assembly 180 through the spout 186. The splash lid 184 may more effectively accommodate the addition of ingredients into the blending jar 116 while the blending blade 118 is in operation. The splash lid 184 provides a place to pour liquids that are intended to be added to the contents of the blending jar 116 while the blender apparatus 100 is in operation without having to remove the splash lid 184 or recessed lid 182 in order to do so. The splash lid 184 may provide at least some venting of the blending jar 116 to help relieve internal pressure within the blending jar 116 generated during operation of the blender apparatus 100.

Figure 18:
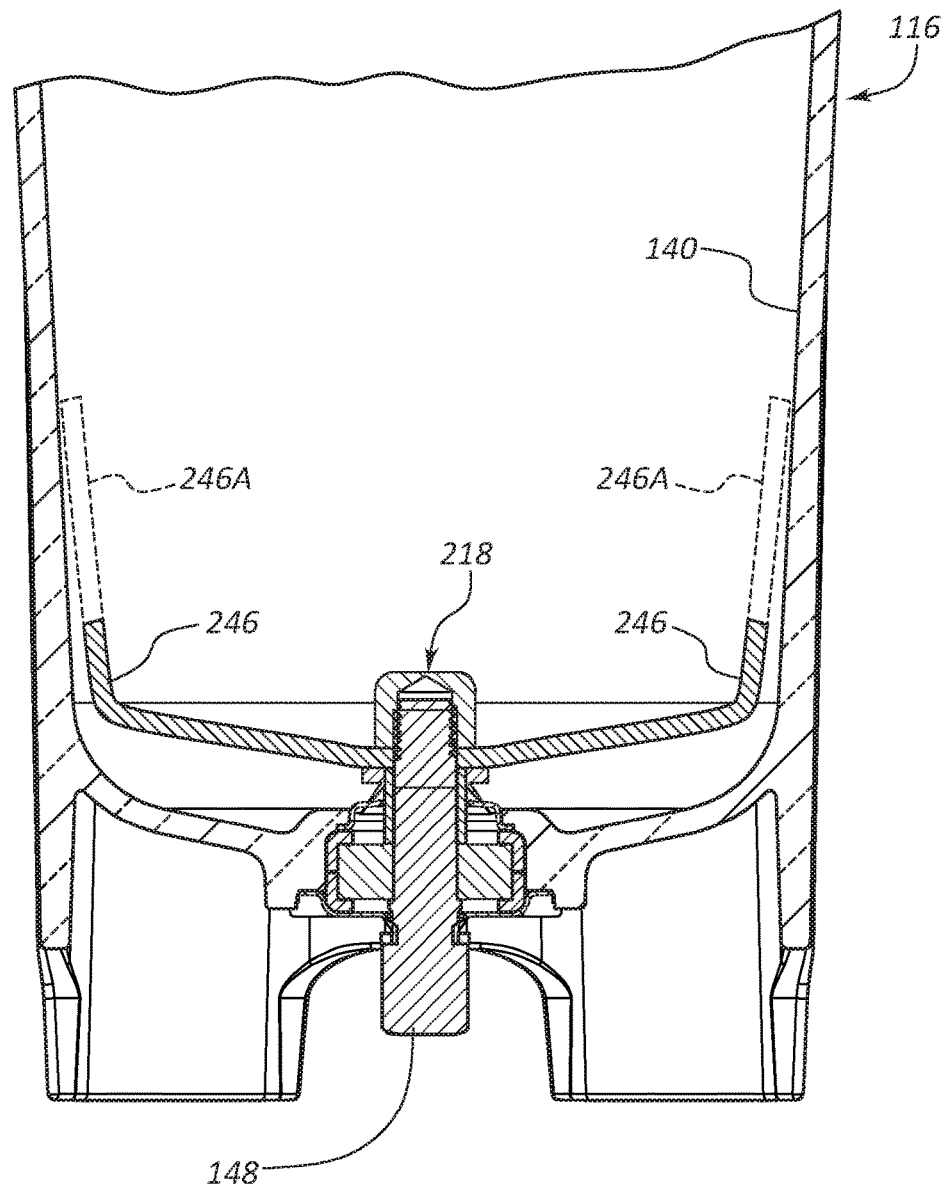
FIG. 18 is a cross-sectional view of a portion of the blending jar of FIGS. 13A-B showing alternatively blending blade embodiments.

Referring now to FIG. 18, the blending jar 116 may include a blending blade 218 having tips or winglets 246. The tips 246 may be positioned adjacent to the internal surface 140 of the blending jar 218. The tips 246 may extend at least partially vertically upward closely adjacent the internal surface 140. The tips 246 may extend upward more (see 246A) or less to provide an optimal scraping or blending function. The extended tips 246A may be referred to as scraper members or scraper portions of the blending blade 218. The tip extensions 246A may be integrally formed as a single piece with the blending blade 218. In some embodiments, the tip extensions 246A may be formed as separate pieces that are connected to the blending blade 218 in a separate assembly step.

The tip extensions 246A may provide a scraper function, similar to the scraper members described herein with reference to lids 20, 120. For example, the extended tips 246A, or the regular tips 246, may help move food particles off of the internal surface 140. The extended tips 246A may help move food particles in an axial direction toward or away from other portions of the blending blade 218. The extended tips 246A may be arranged and configured to disrupt rotational flow of food particles within the internal volume. The extended tips 246A may converge toward the inner cylindrical wall 140 (as shown in FIG. 18) or may extend parallel to and closely adjacent the wall 140.

A portion of the extended tips 246A may alternatively be in contact with the internal surface 140. In some arrangements, the extended tips 246A may be positioned adjacent to the internal surface 140, perhaps with a very slight frictional fit, or remain slightly out of contact with the internal surface 140.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the spirit of the invention. The words "including" and "having," as used in the specification, including the claims, shall have the same meaning as the word "comprising."

We claim:

1. A blending apparatus, comprising:
    a blending jar having an internal surface and an open end, the internal surface defining an internal volume, the internal surface having a sidewall;
    a mixing blade positioned within the internal volume of the blending jar;
    a lid releasably mounted to and sealing the open end of the blending jar, the lid having a peripheral portion and a scraper portion, the scraper portion having a first end attached to the peripheral portion, the scraper portion having a second end extending into the internal volume parallel to the sidewall of the internal surface, the scraper portion being arranged and configured to disrupt food particles adjacent to the sidewall of the internal surface, the lid having a graspable portion centrally disposed on the lid, the graspable portion extending longitudinally away from the internal volume, the graspable portion being configured to rotate the lid relative to the blending jar;
    wherein the lid is rotatable relative to the blending jar while sealing the open end.

2. The blending apparatus of claim 1, wherein the scraper portion extends from the peripheral portion at a circumferential extension angle relative to a central axis of the lid.

3. The blending apparatus of claim 1, wherein the scraper portion extends helically into the internal volume.

4. The blending apparatus of claim 1, wherein the scraper portion is positioned entirely above the mixing blade.

5. The blending apparatus of claim 1, further comprising a second scraper portion extending from the lid into the internal volume.

6. The blending apparatus of claim 1, wherein the lid and the scraper portion are rotatable relative to a central axis of the lid and blending jar while the lid is mounted to the blending jar.

* * * * *